106-99

CROSS REFERENCE

EXAMINER

United States Patent Office 3,197,313
Patented July 27, 1965

3,197,313
ASBESTOS-CEMENT PRODUCTS
Norman S. Greiner, Somerville, N.J., assignor to Johns-Manville Corporation, New York, N.Y., a corporation of New York
No Drawing. Filed Apr. 16, 1962, Ser. No. 187,916
16 Claims. (Cl. 106—15)

This invention relates to improved asbestos-cement products, and specifically to fungus resistant asbestos-cement products such as shingles, sheathing, siding, sheet building products, etc., and means of inhibiting the incipience and/or growth of fungus organisms in asbestos-cement compositions.

Asbestos-cement compositions such as typically utilized in the manufacture of building products are particularly susceptible to fungus attack or incipience and growth as their constituent mineral salts comprises a nutrient for certain thallophyte plant life. And, the relatively porous consistency of normal cementitious bodies along with the presence of nutritional matter provide fertile and substantive environments which in warm or humid climates or areas promote rapid growth of thallophyte life.

There are, of course, numerous fungicides or materials which effectively destroy fungus life or suppress its growth commercially available such as arsenic, mercury, phenolic, etc., compounds; however, their application in typical asbestos-cement compositions or building products thereof has not been over-all effective or satisfactory. For instance, many such typical fungicides comprise materials which are toxic to animal and/or plant life generally as well as to thallophyte plants and therefore cannot be safely utilized in many asbestos-cement building products particularly roofing materials or the like wherein the rain water run-off may be collected for domestic or livestock purposes, or irrigation, etc. And, in addition to a tolerable toxicity level for non-thallophyte life, the fungicidal means or material must be of a characteristic wherein its solubility or leaching is sufficient to provide effective destruction or suppression of fungus life continuously over a period of years somewhat commensurate with the life of the asbestos-cement product. Also, a further prerequisite for the fungicidal material or means is that it maintain its integrity and effectual properties throughout the manufacturing process of the asbestos-cement product which typically includes formation from materials dispersed in a dilute aqueous slurry or the application of substantial quantities of water to a loose uncured mass of discrete matter, and aggressive curing conditions such as several days' exposure to warm, humid atmosphere, or complete submersion under water, or steam autoclaving at high temperatures, etc.

It is a primary object of this invention to provide an economical and effectual means of inhibiting the incipience and/or growth of fungus organisms upon asbestos-cement products such as roofing and siding shingles, boards, sheathing, and the like building and construction items, and the fungus-proof products thereof.

It is also an object of this invention to provide means of inhibiting or suppressing the incipience, continuance or propagation of fungus organisms which is effective and enduring over extended periods of time and which is not toxic to the degree of producing harmful effects upon human, animal and most non-thallophyte life whereby it may be employed in asbestos-cement roofing and/or siding products and the rain water run-off therefore can be safely utilized for domestic and agricultural purposes.

It is a further object of this invention to provide means of imparting non-toxic, enduring fungus-resistant properties to steam cured asbestos-cement products.

It is also an object of this invention to provide non-toxic fungus-resistant asbestos-cement roofing and siding shingles.

These and other objects and advantages of this invention will become more apparent from the hereinafter detailed description.

This invention comprises the discovery that barium borates, particularly the compound barium metaborate monohydrate, when dispersed throughout an asbestos-cement composition will endure the usual conditions and rigors of manufacturing typical asbestos-cement products including aqueous dispersion in a medium and steam curing, and impart to the resulting product a high degree of lasting resistance to incipience continuance or growth of fungus or the like thallophyte plant organisms.

The specific barium borates for the effective protection against micro-organisms such as fungi consists of anhydrous and/or hydrated compounds of oxides of barium and boron including those compounds having from 3 mols of BaO to 1 mol of $B_2O_3$ ranging through to those having 1 mol of BaO to 4 mols of $B_2O_3$, such as $3BaO \cdot B_2O_3$, $BaO \cdot B_2O_3$, $BaO \cdot 2B_2O_3$, or $BaO \cdot 4B_2O_3$, and which exhibit very low or maximum solubilities in distilled water at 25° C. of no more than about 0.35%, desirably less than about 0.25% and preferably about 0.15%, as determined by making a saturated solution of the particular barium borate powder in distilled water and calculating with the formula:

$$\frac{\text{wt. of dissolved barium borate}}{\text{wt. of water}} \times 100$$

The preferred fungicidal material, barium metaborate monohydrate ($BaO \cdot B_2O_3 \cdot H_2O$), exhibits an optimum solubility of about 0.15%.

Effective amounts or proportions of the barium borate as a fungicide comprise at least about 5% by weight of the asbestos-cement product, or of the surface or weather exposed areas thereof such as a veneer layer, and preferably about 10 to 15% by weight of the item or of the weather exposed surface or veneer. Generally no more than about 20 to 25% by weight of the item, weather exposed surface or veneer thereof is suitable as excessive amounts do not produce results commensurate with the cost thereof and they tend to dilute or diminish other desirable or necessary properties of the product such as strength, color, etc.

To provide maximum distribution or over-all uniformity and endurance of the fungicide effect, the average particle size of the barium borate material should range between about 1 to 10 microns and preferably with about 65% of said particles less than 10 microns, about 30% of said particles less than 5 microns, and no more than about 3% of said particles less than 1 micron. Barium borates with a maximum solubility of about 0.15% and average particle size between about 1 to 10 microns, when incorporated in asbestos-cement roofing shingles in amount of approximately 10% by weight of the veneer surface gave leaching rates of about 0.0020 to 0.0025% when continuously submerged in distilled water for a period of 14 days, and rates of about 0.0039 to 0.0043% for a like 28-day submersion. Such relatively low product solubilities or rates of leaching provide years of effective resistance to fungi in far less stringent actual roofing applications.

The barium borates of this invention primarily due to their efficacious solubilities and their particle size distribution given are suitable for use in asbestos-cement products manufactured by all typical techniques including but not necessarily limited to dry machine procedures or the so-called Norton process, an example of which is illustrated by U.S. Letters Patent No. 2,230,880 to Brown, wet machine procedures or the so-called Hatchek process which is illustrated by U.S. Letters Patent No. 2,182,353 to Rembert et al., or simply by shaping or casting an appropriate mix either with or without consolidating pressures. Moreover, the barium borates are applicable to and compatible with conventional asbestos-cement formulations which may include, in addition to hydraulic cements such as Portland cements, slag cements, etc., and the asbestos fiber, silica either as a filler or a reactant with components of the hydraulic cement when steam cured, fillers such as perlite or light weight aggregate, various fibers or reinforcement in addition to asbestos, color pigments, conventional cement additives or modifiers such as air entraining agents, accelerators or retarders, gelling or thickening agents, etc.

As should be apparent, this invention, the imparting of lasting fungus resistance through the inclusion of about 10 to 15% of sized barium borates of low solubility, is particularly applicable to conventional asbestos-cement building products such as shingles for roofing and/or siding applications, especially the former as fungus attack is most acute on non-vertical surfaces, wherein it is highly effective in alleviating the unsightliness of fungus or the like thallophytic growths. Also, as typical domestic siding and roofing shingles very frequently comprise a base sheet with a pigmented veneer to impart color to the exposed or weather surface, it is only necessary to apply the barium borate particles to the veneer or the like weather exposed surface portion(s) of a shingle or product in the appropriate amounts such as about 10 to 15% by weight of the said veneer or surface portion(s) rather than throughout the entire body of the item to obtain enduring efficaciousness of the treatment.

The means of inhibiting or suppressing the fungus life of this invention being particularly adaptable to the manufacture of and advantageous in roofing shingles, the following example illustrates the application of the novel concept of this invention in formulating asbestos-cement roofing shingles or to the asbestos-cement veneer provided thereon, and the utility of the product. It is to be understood that this example is given for purposes of illustration rather than limitation, and that the specific conditions or products produced therein, manufacturing techniques or procedures and conditions set forth are merely exemplary and are not to be construed as limiting the invention to any particular means or conditions.

*Example*

Fungus-resistant white veneered roofing shingles were produced by applying to dry process manufactured base sheets composed of about 20% by weight of asbestos fiber, about 30% by weight of Portland cement, about 20% by weight of silica flour, and about 30% by weight of finely ground shingle scrap, and formed according to the procedure of U.S. Patent No. 2,230,880, a white veneer in a thickness of about 0.015 inch consisting of the following in percent by weight:

| | Percent |
|---|---|
| Asbestos fiber | 10 |
| Portland cement | 25 |
| White pigment (calcium carbonate and titanium dioxide) | 28 |
| Silica | 25 |
| Barium metaborate monohydrate* | 12 |

* Barium metaborate monohydrate particle size distribution was 68% less than 10 microns, 29% less than 5 microns, and 3% less than 1 micron.

The veneer material of the foregoing composition was applied dry from a shaker screen upon the wet surface of the consolidated base sheet or body, the loose mixture of veneer material was shaped and the entrained air removed therefrom with a perforated roll and then wet in the manner illustrated in U.S. Patent No. 2,230,880, and final consolidation applied with a pressure roll at 4000 pound per linear inch. The thus produced and shaped body was cut to individual size shingles and upon air curing for 2 days the shingles were steam cured in an autoclave at 100 p.s.i.g. pressure (338° F.) for 6 hours.

Analytical tests established the amount of barium metaborate monohydrate contents of the dry mix veneer furnish, the veneer of the air cured shingle, and of the veneer of the steam cured shingles to be as follows:

| | Percent |
|---|---|
| Dry veneer | 12.0 |
| Veneer of air cured shingles | 10.9 |
| Veneer of steam cured shingles | 10.1 |

The barium borate leaching rate for the above produced veneered shingles was determined by completely submerging sample shingles in distilled water for specified periods and determining the amount of barium borate leached within the period. A 14-day leaching time wherein the shingle was completed submerged resulted in the leaching of 23.2 milligrams of barium borate per liter, or 23.2 parts per million, or 0.0023%, and a 28-day leaching period of complete submersion resulted in the leaching of 41.4 parts per million or 0.0041% of the barium metaborate.

White veneered barium metaborate monohydrate containing shingles produced according to the foregoing example were compared with identically formulated and prepared veneered shingles without the barium metaborate monohydrate by subjecting samples of each to actual weather conditions in Louisiana. Upon 18 months exposure shingles containing approximately 10% of barium metaborate monohydrate in their veneer developed only slight fungus growth discernible upon microscopic analysis, whereas the control shingles without barium borate were substantially covered with heavy fungus growth which was visible and rendered them unsightly at a substantial distance.

It will be understood that the foregoing details are given for purposes of illustration, not restriction, and that the variations within the spirit of this invention are intended to be included within the scope of the appended claims.

What I claim is:

1. A fungus resistant asbestos-cement product comprising essentially at least approximately 20% by weight of hydraulic cement and at least approximately 5% by weight of asbestos fiber, and containing dispersed throughout approximately 5 to 25% by weight of finely divided particulate barium borate.

2. A fungus resistant asbestos-cement product comprising essentially at least approximately 20% by weight of hydraulic cement, silica in amount up to approximately 40% by weight and at least approximately 5% by weight of asbestos fiber, and containing dispersed throughout approximately 5 to 25% by weight of finely divided particulate barium borate.

3. A veneered asbestos-cement product composed of an asbestos-cement base having a surface veneer comprising essentially at least approximately 20% by weight of hydraulic cement, at least approximately 5% by weight of silica, at least approximately 5% by weight of pigments and at least approximately 5% by weight of asbestos fiber, and containing dispersed throughout the said veneer approximately 5 to 25% by weight of finely divided particulate barium borate.

4. A fungus resistant, steam cured asbestos-cement product comprising essentially at least approximately 20% by weight of hydraulic cement, silica in amount up to approximately 40% by weight and at least approximately 5% by weight of asbestos fiber, and containing dispersed throughout approximately 5 to 25% by weight of finely divided particulate barium borate.

5. A fungus resistant asbestos-cement product comprising essentially at least approximately 20% by weight of hydraulic cement, silica in mount up to approximately 40% by weight and at least approximately 5% by weight of asbestos fiber, and containing dispersed throughout approximately 5 to 20% by weight of particulate barium borate having at least approximately one half of its particles sized between about 1 to 10 microns in diameter.

6. A fungus resistant asbestos-cement sheet product comprising essentially at least approximately 20% by weight of hydraulic cement, silica in amount up to approximately 40% by weight and at least approximately 5% by weight of asbestos fiber, and containing dispersed throughout approximately 10 to 15% by weight of particulate barium borate having at least approximately one half of its particles sized between about 1 to 10 microns and an average solubility in distilled water at 25° C. of about 0.15%.

7. A veneered asbestos-cement sheet product composed of an asbestos-cement base having a surface veneer comprising essentially at least approximately 20% by weight of hydraulic cement, at least approximately 5% by weight of silica, at least approximately 5% by weight of pigments and at least approximately 5% by weight of asbestos fiber, and containing dispersed throughout the said veneer approximately 5 to 20% by weight of particulate barium borate having at least approximately one half of its particles sized between about 1 to 10 microns.

8. A steam cured asbestos-cement product consisting essentially of Portland cement, silica, and asbestos fiber, and containing dispersed throughout approximately 10 to 15% by weight of particulate barium borate having an approximate particle size distribution of 68% less than 10 microns, 29% less than 5 microns, and 3% less than 1 micron, and a maximum solubility in distilled water at 25° C. of about 0.15%.

9. A veneered asbestos-cement sheet product composed of an asbestos-cement base having a veneer consisting essentially of Portland cement, sicila, pigments and asbestos fiber, and containing dispersed throughout the said veneer approximately 10 to 15% by weight of particulate barium metaborate monohydrate having an approximate particle size distribution of 68% less than 10 microns, 29% less than 5 microns, and 3% less than 1 micron, and a maximum solubility in distilled water at 25° C. of about 0.15%.

10. A steam cured, veneered asbestos-cement shingle composed of an asbestos-cement base having a surface veneer comprising approximately 10% by weight of asbestos fiber, approximately 25% by weight of Portland cement, approximately 25% by weight of silica, approximately 28% by weight of pigments, and approximately 10% by weight of barium metaborate monohydrate dispersed throughout the said veneer, the barium metaborate monohydrate having an approximate particle size distribution of 68% less than 10 microns, 29% less than 5 micron, and 3% less than 1 micron, and a maximum solubility in distilled water at 25° C. of about 0.15%.

11. The method of inhibiting the incipience and growth of fungus organisms upon asbestos-cement products which consists essentially of providing therein approximately 5 to 25%, by weight of the product, of finely divided barium borate.

12. The method of inhibiting the incipience and growth of fungus organisms upon asbestos-cement products which consists essentially of providing therein approximately 5 to 20%, by weight of the asbestos-cement product, of particulate barium borate having at least approximately one half of its particles sized between about 1 to 10 microns.

13. The method of inhibiting the incipience and growth of fungus organisms upon asbestos-cement products which comprises providing therein approximately 5 to 20%, by weight of the asbestos-cement product, of particulate barium metaborate monohydrate having at least approximately one half of its particles sized between about 1 to 10° microns and a maximum solubility in distilled water at 25° C. of about 0.15%.

14. The method of inhibiting the incipience and growth of fungus organisms upon asbestos-cement products which comprises providing throughout the weather exposed surface of the product approximately 5 to 20% by weight thereof of particulate barium borate having at least approximately one half of its particles sized between about 1 to 10 microns.

15. The method of inhibiting the incipience and growth of fungus organisms upon asbestos-cement products which comprises providing throughout the weather exposed surface approximately 10 to 15% by weight thereof of particulate barium metaborate monohydrate having an approximate particle size distribution of 68% less than 10 microns, 29% less than 5 microns, and 3% less than 1 micron, and the maximum solubility in distilled water at 25° C. of about 0.15%.

16. The method of inhibiting the incipience and growth of fungus organisms in steam cured asbestos-cement products which comprises applying thereto an asbestos-cement veneer containing dispersed throughout approximately 10 to 15% by weight of the said veneer of particulate barium metaborate monohydrate having an approximate particle size distribution of 68% less than 5 microns, 29% less than 5 microns, and 3% less than 1 micron, and a maximum solubility in distilled water at 25° C. of about 0.15%.

References Cited by the Examiner

UNITED STATES PATENTS 2,084,354  6/37  Morbelli _____ 106—99
2,818,344  12/57  Buckman _____ 106—15

ALEXANDER H. BRODMERKEL, *Primary Examiner.*

JOHN H. MACK, MORRIS LIEBMAN, *Examiners.*